United States Patent [19]

Ruoff

[11] Patent Number: 5,387,406
[45] Date of Patent: Feb. 7, 1995

[54] METHOD AND DEVICE FOR THE ADSORPTION AND CHEMISORPTION, RESPECTIVELY, OF GASEOUS COMPONENTS IN A GAS STREAM

[75] Inventor: Günter Ruoff, Köln, Germany

[73] Assignee: Walther & Cie AG, Cologne, Germany

[21] Appl. No.: 33,006

[22] Filed: Mar. 18, 1993

Related U.S. Application Data

[63] Continuation-in-part of Ser. No. 761,260, Sep. 17, 1991.

[30] Foreign Application Priority Data

Sep. 17, 1990 [DE] Germany ............... 4029395

[51] Int. Cl.⁶ ............... B01D 53/00; B01D 53/06; B01D 46/00
[52] U.S. Cl. ............... 423/210; 55/341.1; 55/367; 95/273; 422/177; 422/306
[58] Field of Search ............... 423/210; 422/177, 306; 55/380, 366, 341.1, 367; 95/273

[56] References Cited

U.S. PATENT DOCUMENTS

| | | | |
|---|---|---|---|
| 3,424,501 | 1/1969 | Young | 302/21 |
| 3,520,109 | 7/1970 | Caskey | 55/96 |
| 3,704,573 | 12/1972 | Koller et al. | 55/268 |
| 3,839,185 | 10/1974 | Vicard | 204/307 |
| 3,926,595 | 12/1975 | Böckman | 55/302 |
| 4,432,862 | 2/1984 | Swart et al. | 208/64 |
| 4,865,627 | 9/1989 | Dewitz et al. | 55/20 |
| 4,874,586 | 10/1989 | Szymanski et al. | 422/177 |
| 4,913,815 | 4/1990 | Shulda | 210/287 |
| 4,999,032 | 3/1991 | Wright | 55/97 |

FOREIGN PATENT DOCUMENTS

| | | |
|---|---|---|
| 2871889 | 7/1989 | Australia . |
| 0318934 | 6/1989 | European Pat. Off. . |
| 3806862 | 9/1989 | Germany . |
| 3801913 | 3/1990 | Germany . |

*Primary Examiner*—Gary P. Straub
*Assistant Examiner*—Timothy C. Vanoy
*Attorney, Agent, or Firm*—Horst M. Kasper

[57] ABSTRACT

A method and a device are provided for the adsorption and chemisorption, respectively, of gaseous components out of a gas stream. The dust return is achieved within a fabric filter. A combination comprising a nozzle and a trap shaft are disposed in the lower part of the fabric filter. Thereby both a changeable gas return as well as a dust return changeable and variable over wide ranges can be effected. This method is performed in a total filter plant with several filter chambers. One of the filter chambers is alternatingly cleaned for the discharge of the reaction products and simultaneously at least one filter chamber is operated in on-line operation.

29 Claims, 7 Drawing Sheets

METHOD AND DEVICE FOR THE ADSORPTION AND CHEMISORPTION, RESPECTIVELY, OF GASEOUS COMPONENTS IN A GAS STREAM

CROSS-REFERENCE TO RELATED APPLICATIONS

This application is a continuation-in-part application of an application filed Sep. 17, 1991 and bearing Ser. No. 07/761,260. The entire disclosure of this latter application, including the drawings thereof, is hereby incorporated in this application as if fully set forth herein.

In the following the term absorbent or adsorption shall also include processes which might be considered as absorptive processes or as absorption even though only the term adsorption will appear.

BACKGROUND OF THE INVENTION

1. Field of the Invention

The invention relates to a method and a device for the adsorption or chemisorption of gaseous materials from a raw gas stream by addition of dry adsorbents or by adsorbents possibly with properties, which effect a chemical reaction with the adsorbed gas components. The raw gas and the fresh adsorbent are fed to a separator structure including several filter chambers formed as bag filter collectors. A dust return is performed with a recirculation of the 20- to 80-fold of the employed fresh adsorbent. A part of the gas is maintained in circulation in the bag filter collector by way of a trap shaft or central guide pipe with a coordinated nozzle. Thereby separated dust is participating after its purification in the recirculation process.

Such a method is to increase the yield for the adsorbent in case of drying processes with the lowest possible investment requirement and under avoidance of complicated and expensive equipment for the return of the dust. This method and a device for the performance of the method are described in the German Printed Patent Documents DE-OS 38 01 913 and DE-OS 38 06 862. This method and device serve for the adsorption and chemisorption, respectively, of gaseous materials from a gas stream. It is a substantial feature of the method that the dust is retained and is returned within a fabric filter, and this is achieved by disposing a combination, comprising a nozzle and a trap shaft, in the lower part of the fabric filter, whereby both a changeable and adaptable gas return as well as a dust return changeable and adaptable within wide ranges are effected.

Both the method as well as the device allow recognition of disadvantages which are recited in the following in more detail by reference with respect to the state of the art.

Various other attempts have been taught in connection with gas purification such as for example in the following references:

European Patent Application 0,318,934 to Szymznski et al.,
U.S. Pat. No. 3,424,501 to H. T. Young,
U.S. Pat. No. 3,520,109 to E. K. Caskey,
U.S. Pat. No. 3,704,573 to Koller et al.,
U.S. Pat. No. 3,839,185 to Vicard,
U.S. Pat. No. 3,926,595 to Böckman,
U.S. Pat. No. 4,432,862 to Swart et al.,
U.S. Pat. No. 4,865,627 to Dewitz et al.,
U.S. Pat. No. 4,913,815 to Shulda, and
U.S. Pat. No. 4,999,032 to Wright.

SUMMARY OF THE INVENTION

1. Purposes of the Invention

It is an object of the present invention to avoid the disadvantages of the conventional methods and apparatus and to maintain both the desired dust return quota as well as to separate the used adsorbent from the process and thereby to further decrease the production costs for the apparatus.

It is another object of the present invention to provide a more effective method of separating gases from other components in raw gases.

It is yet a further object of the invention to provide an efficient apparatus which allows to perform gas separation substantially under recycling conditions.

These and other objects and advantages of the present invention will become evident from the description which follows.

2. Brief Description of the Invention

According to the present invention there is provided for a method for sorptive separation of gaseous materials out of a raw gas stream. A separator structure is formed including a first filter chamber operating as a first fabric bag filter collector and including a second filter chamber operating as a second fabric bag filter collector. A first valve lock or flap is opened. A raw gas mixture is added after passing the opened first valve lock from a bottom into a first vertically extending pipe or vertical riser conduit. Adsorbents and recycled adsorbent dust, after separation and cleaning of the adsorbent dust, are added to the raw gas mixture in upward direction in the first vertically extending pipe. The raw gas stream is accelerated in a first neck forming a first nozzle at an upper end of the first vertically extending pipe. The raw gas mixture and the adsorbents are fed to the first filter chamber including a plurality of fabric filter compartments. A part of the raw gas mixture is maintained in the first fabric bag filter collector by passing the raw gas mixture through a first trap shaft or central guide pipe after accelerating with the first nozzle. A second valve lock or flap is opened. A raw gas mixture is fed after passing the opened second valve lock from a bottom into a second vertically extending pipe or second vertical riser conduit. Adsorbents and recycled adsorbent dust after separation and cleaning of the recycled adsorbent dust are added to the raw gas mixture moving in upward direction in the second vertically extending pipe. The raw gas stream is accelerated in a second neck forming a second nozzle at an upper end of the second vertically extending pipe. The raw gas mixture and the fresh adsorbent are fed to the second filter chamber including a plurality of fabric filter compartments. A part of the raw gas mixture is maintained in the second fabric bag filter collector by passing the raw gas mixture through a second trap shaft after accelerating with the second nozzle. The first valve lock is closed. The feeding of the raw gas mixture is stopped to the bottom of the first vertically extending pipe. A first output valve connected to a first output of the first filter chamber is closed. The first filter chamber is subjected to a cleaning while said first filter chamber is off-line for the separation operation from the raw gas stream. The reaction product including the adsorbent and the adsorbed material is separated out of the first filter chamber and the second filter chamber is operating simultaneously in on-line operation. An adsorbent dust return is employed by recirculating a volume from about 20 more than to 80 times more recycled adsorbent from the first filter chamber as compared to the weight of the fresh adsorbent added to the process per time unit.

A chemisorptive adsorbent or a dry adsorbent can be employed for effective separation and removal of a gaseous component from a raw gas mixture. Alternatively, there can be employed an adsorbent having properties effecting a chemical reaction with an adsorbed gas components.

The second raw gas feed or second raw gas channel and a second pure gas discharge or second pure gas channel can be closed during the off-line operation of the second filter chamber. Fabric bags of the second fabric filter compartment can be cleaned during this state of processing.

Some of the fabric bags present in the first filter chamber can be cleaned. A cycle of the off-line/on-line operation for maintaining a selected set ratio of adsorbent dust return relative to fresh adsorbent entered per unit of time can be selected such that the amount of finally discharged adsorbent dust is equal to the amount of fresh adsorbent entered and fed in during the time duration of the on-line operation.

A wall of the filter chamber can be vibrated during operation and the neck can be employed both as a passage for feeding the raw gas to the filter chamber and as a passage for discharging dust collected at fabric filters of the first filter chamber. A wall of the filter chamber can be repeatedly beaten during operation for loosening deposits adhering to the wall.

According to the present invention there is further provided for an apparatus for sorptive separation. Filter chambers are in each case mounted on a machine frame and exhibit a top and a bottom. Filter bags are disposed in said filter chambers. Several filter bags surround a central free space of the respective one of the filter chambers. An upper pure gas chamber is connected at a respective one of the tops of the filter chambers. The filter chambers include in each case an inclined floor having a lower center opening. A trap shaft or central guide pipe is disposed within a free space inside the filter chamber at a distance relative to the upper pure gas chamber and above the lower center opening. A restricted section forming a nozzle is connected to the lower center opening in the inclined floor. The restricted section is spaced apart from the trap shaft or central guide pipe. The restricted section is coordinated symmetrically and leaving an open passage distance to the lower end of the trap shaft and is fixedly connected to the inclined floor in the region of the lower center opening of the inclined floor and said restricted section further has a lower opening. A vertical riser conduit has a lower end, and an upper end of the vertical riser conduit is connected to the restricted section. A raw gas channel is connected to the lower end of the vertical riser conduit. A lower dust discharge is connected at the bottom of the vertical riser conduit. A discharge sluice is furnished in the lower dust discharge or raw gas channel. A gas supply means is connected to the raw gas channel for feeding gas to the raw gas channel.

The inclined floor can form a minimum angle of from about 20 to 30 degrees between a vertical line and a tangent face of an inclined wall of the filter chamber.

Opening and closing means or a valve lock are disposed in the gas supply line for releasing operation and for blocking operation of the filter chambers. A second opening and closing means or a second valve lock can be disposed in the raw gas channel for releasing operation and for blocking operation of the filter chamber, thereby forming an air lock by combination of the first opening and closing means and of the second opening and closing means. A feed for blocking air can be connected to the raw gas channel between the first opening and closing means and the second opening and closing means.

A feed line for fresh adsorbent material can join the raw gas channel or the vertical riser conduit prior to the connection to the nozzle.

A gas supply means can be located near the bottom of said vertical riser conduit to assist in removing dust from the vertical riser conduit.

The feed-in of the sorbent for the filter chamber, closed on the gas input side, is interrupted by a programmable control circuit. The cycle of the off-line/on-line operation is selected for maintaining a selected set ratio of dust return relative to fresh adsorbent such that the amount of discharged dust is equal to the amount of fresh adsorbent entered and fed in during the time duration of the on-line operation by cleaning a certain part amount of the fabric filter bags present in one chamber. The cycle of the off-line/on-line operation is controlled by a programmable control circuit.

A feed line can be provided for delivering fresh adsorbent material to the raw gas passing through the vertical riser conduit at a point prior to the connection of the vertical riser conduit to the restricted section.

The raw gas channel can be disposed horizontally and can be connected through an elbow to the lower end of the vertical riser conduit. The restricted section forming a nozzle can be operatively connected to the bottom of the filter chamber. Said restricted section in combination with the inclined floor of the filter chamber and a larger diameter of the vertical riser conduit can form the nozzle capable of entraining particulates formed in the filter bags during operation.

In accordance with the invention, one of the filter chambers is available and cleaned during off-line operation for separation of the reaction products and, simultaneously, at least one filter chamber is operated in on-line operation.

It is disclosed according to a further embodiment of the method that the corresponding raw gas channel and possibly the corresponding pure gas channel are closed for the off-line operation of a filter chamber and that a part or all fabric filter bags of the filter chamber are cleaned in a conventional way during this time of off-line operation. The cycle of the off-line/on-line operation can be selected for the maintenance of the set ratio of dust return relative to fresh adsorbent such that the amount of the discharged dust, based on purification of a certain part of the number of the fabric filter bags present in a filter chamber, is equal to the amount of the fresh adsorbent fed in during the duration time of operation of the on-line operation.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
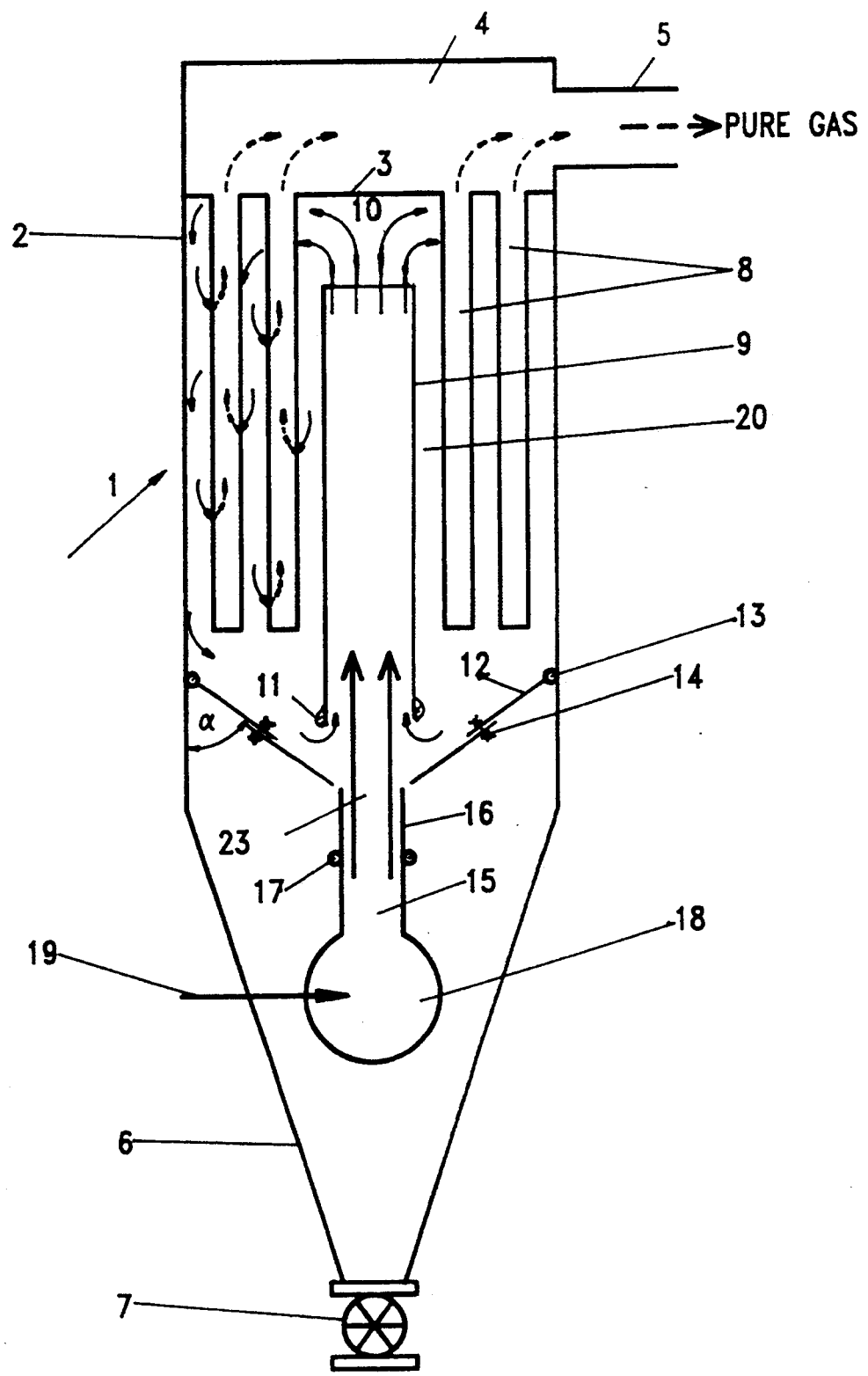
FIG. 1 shows a cross-sectional view through an apparatus according to the state of the art.

According to the present invention there is provided for a method for adsorption or chemisorption of gaseous materials out of a raw gas stream by addition of dry adsorbents with the adsorbed gas components. The raw gas and the adsorbent are fed to a separator structure 111 with a plurality of filter chambers formed as a plurality of bag filter collectors. A plurality of trap shafts or central guide pipes are each disposed in one filter chamber of the plurality of filter chambers. A dust return is performed with a recirculation of from about a 20 more than to 80-fold amount relative to the amount of the employed fresh adsorbent in the plurality of the filter chambers. A part of the raw gas is maintained in circulation in one fabric bag filter collector of the plurality of bag filter collectors by way of one trap shaft of the plurality of trap shafts with one nozzle of a plurality of nozzles. Thereby separated dust precipitates and is fed back into the recirculation after its cleaning. A part of the raw gas is maintained in circulation in a second one fabric bag filter collector of the plurality of bag filter collectors by way of a second one trap shaft of the plurality of trap shafts with a second one nozzle of the plurality of nozzles. Thereby separated dust precipitates and is fed back into the recirculation while simultaneously a part of the gas is maintained in circulation in the second one fabric bag filter collector. The first one of the filter chambers is cleaned while in off-line operation for separating the reaction product. Simultaneously the second one filter chamber is operated in on-line operation.

The respective raw gas feed or raw gas channel and possibly the respective purified gas discharge or pure gas channel can be closed for the off-line operation of the second one filter chamber. Fabric filter bags of the first filter chamber operating off-line can be cleaned during this time.

Circulation can be resumed in the first filter chamber after the cleaning. The second filter chamber can be subjected to a dust separator while the first filter chamber remains operating. A cycle of the off-line/on-line operation can be continued between the first filter chamber and the second filter chamber. The cycle can be selected for maintaining a selected set ratio of dust return relative to fresh adsorbent such that an amount of discharged dust can be equal to the amount of fresh adsorbent entered and fed in during the time duration of the on-line operation, by cleaning a certain part amount of the fabric bags present in a respective filter chamber.

The present invention further provides for an apparatus for the performance of the above-described method. The apparatus includes that fabric filter bags are disposed in individual filter chambers, with fabric filter bags surrounding a central free space, an upper pure gas chamber and a lower dust discharge. An inclined floor with a lower center opening is provided to form a lower part of the filter chambers. A trap shaft or central guide pipe is disposed within the free space at a distance relative to a pure gas chamber part of the filter chambers and above the opening. A restricted section forms a nozzle and is connected at an upper end to the lower center opening. The restricted section is coordinated symmetrically with a distance to the lower end of the trap shaft. The inclined floor is fixedly connected in the region of its opening to the restricted section. A vertical riser conduit is connected at an upper end to a lower end of the restricted section. A gas feed line or raw gas channel is connected to a lower end of the vertical riser conduit for feeding gas into the lower end of the vertical riser conduit. A discharge sluice is furnished in the gas feed line or lower dust discharge.

Vibration means can be disposed at an inclined section or floor of the filter chamber. A feed line for adsorbent material can be connected to the vertical riser conduit for delivering active adsorbent material to the gas prior to reaching the restricted section. Gas supply means can be connected to the gas feed line or raw gas channel. A discharge member for spent adsorbent or lower dust discharge can be disposed at a bottom of the vertical riser conduit. An aeration line can be connected to the vertical riser conduit. An aeration nozzle can be connected to the aeration line and can be directed toward the discharge member for loosening dust in a lower part of the vertical riser conduit. An aeration valve can be disposed in the aeration line.

FIG. 1 shows a filter chamber illustrated as a bag filter collector 1. The bag filter collector comprises a filter casing 2 with an upper floor 3. The fabric filter bags 8 are suspended in the filter casing 2. The filter casings 2 are designated as chambers in the context of a total filter plant system. A pure gas chamber 4 with a pure gas channel 5 having a pure gas discharge port is provided above the upper floor 3, and the pure gas exits through the pure gas channel 5. A dust collection hopper having a hopper wall 6 with an exit sluice 7 is furnished at the lower end of the bag filter collector 1. The fabric filter bags 8 are arranged in a central free space 20, wherein a rectangular trap shaft 9 or central guide pipe is disposed. The rectangular trap shaft 9 is disposed with its upper end 10 at a certain distance relative to the upper floor 3. Inclined disposed dust guide sheet metal pieces 12 are furnished at a distance relative to the lower end 11 of the trap shaft 9, where the dust guide sheet metal pieces 12 are attached at hinges 13 at the filter casing 2 of the filter chamber. The dust guide sheet metal pieces 12 are disposed such that they form, on the one hand, an inner opening 23 and, on the other hand, together with the lower end 11 of the trap shaft 9, a slot 24. By adjustment of the inclination angle alpha of the dust guide sheet metal piece 12, the slot 24 can be widened and extended. A nozzle 15 is furnished below the inner opening 23. The nozzle cross-section can be changed by adjustment of the position of the upper nozzle walls 16. For this purpose, the nozzle walls 16 are furnished with nozzle hinges 17 disposed at the lower edges of the nozzle walls 16. The raw gas channel 18 is connected at the lower side of the nozzle 15 and the adsorbent is fed finely dispersed into the raw gas channel 18 by way of a conduit 19.

The raw gas with the adsorbent contained in the raw gas passes via the nozzle 15 and the trap shaft 9 and from there into the upper region of the fabric filter bags 8. The gas is led through the fabric filter bags 8 and thus substantially separated and freed from dust previously carried. Thereby, a dust layer of increasing thickness is formed at the surface of the fabric filter bags 8. This dust layer can be cleaned and removed according to known methods at certain defined time intervals. The pure gas, substantially freed from dust and damaging materials, leaves the bag filter collector or filter chamber 1 via the pure gas chamber 4 and the pure gas discharge port of the pure gas channel 5. The amount of fresh adsorbent necessary for the process is admixed by suitable devices to the raw gas stream immediately prior to entrance into the filter chamber. It is conceivable, that the adsorbent is fed into the system at another suitable location, for example, behind the nozzle 15. The dust-laden raw gas exits upwardly through a slot of a width 25 from the raw gas channel 18, which can narrow and taper in the flow direction, and said dust-laden raw gas is shaped and guided into a directional beam by the side-limiting upper nozzle walls 16. The direction of the walls 16 can be changed by way of nozzle hinges 17. The gas exiting out of the nozzle 15 of the original width 25 can be changed to a decreased width 26. The distance of the nozzle 15 relative to the lower end 11 of the trap shaft 9 is determined according to generally known methods. The open distance width 27 of the walls of the trap shaft 9 is larger than the open distance width 25 of the walls of the nozzle 15. The dust falling downwardly during the cleaning of the bags is carried along in part by a reversed and/or returned gas stream of an inner circulation. Another part of the downwardly falling dust leaves the internal return system through adjustable openings or slots 28 in the dust guide sheet metal pieces 12, and is collected in the dust collection hopper 6 of the filter chamber 1 and discharged via the exit sluice 7. A further part of the deposited and separated dust passes and slides over the dust guide sheet metal pieces 12 and falls over the front edge of the dust guide sheet metal piece 12 into the gas stream exiting from the nozzle 15 serving as a collection bin or can, which gas stream returns this dust component into the system while admixed with the gas of the gas stream. The dust guide sheet metal pieces 12 comprise two parts which are furnished at their ends with elongated holes and are fixed after their adjustment with the aid of a screw connection 14. An additional dust component can be removed from the circulation system by a change of the length 29 (FIG. 2) and can be fed to the dust collection hopper 6 and vice versa.

Figure 2:
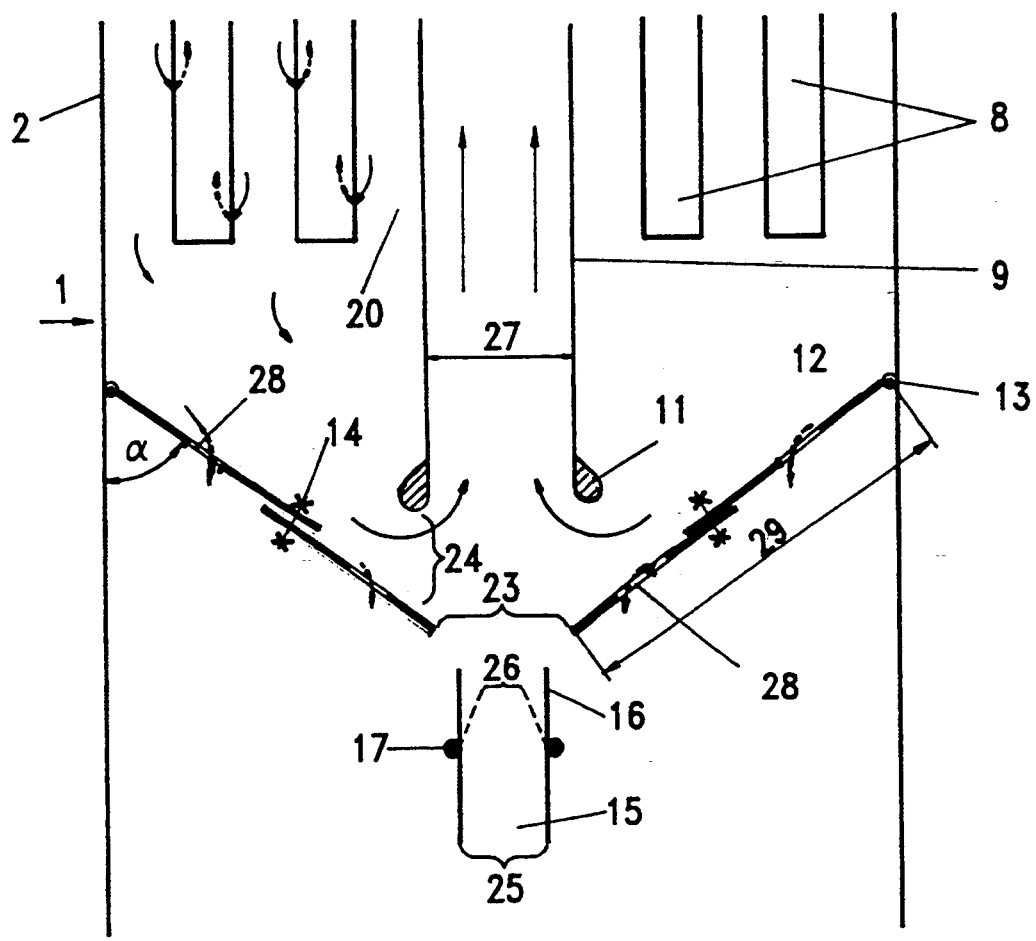
FIG. 2 shows an enlarged detail view of the apparatus according to the state of the art according to FIG. 1.

However, disadvantages are recognized during the performance of this method when using the invention device. FIGS. 1 and 2 illustrate the state of the art according to the above recited patents and are employed in this context in order to illustrate the above recited disadvantages.

The dust guide sheet metal pieces 12 are illustrated in FIG. 1 and FIG. 2 with an inclination angle alpha of about 45 degrees. Many dust materials, however, have a tendency to form deposits, crusts or sediments at the inclined, planar walls, such that the inclination illustrated here is often insufficient to assure a flowing off of the dust under all operating conditions. A steeper disposition of the dust guide sheet metal piece 12 would then be necessary which would however lead to the situation that the lower part of the filter casing would have to be substantially extended, in particular in case of large filter chambers with a large number of adjacently disposed hose and/or bag rows. In order to assure that the dust flows off under any and all operating conditions and that the dust is discharged properly, inclination angles would have to be employed as they are illustrated in the lower part of the filter casing at the walls of the dust collection hopper 6 of FIG. 1. It can be recognized from FIG. 1 without further explanation that the nozzle 15 and the raw gas channel 18 would then have to be relocated substantially downwardly with the consequence that the walls of the dust collection hopper 6 would then have to be disposed and attached correspondingly lower at the filter casing 2 in order to create space for the nozzle 15 and the raw gas channel 18. Such a step would result in substantially additional costs.

Figure 3:
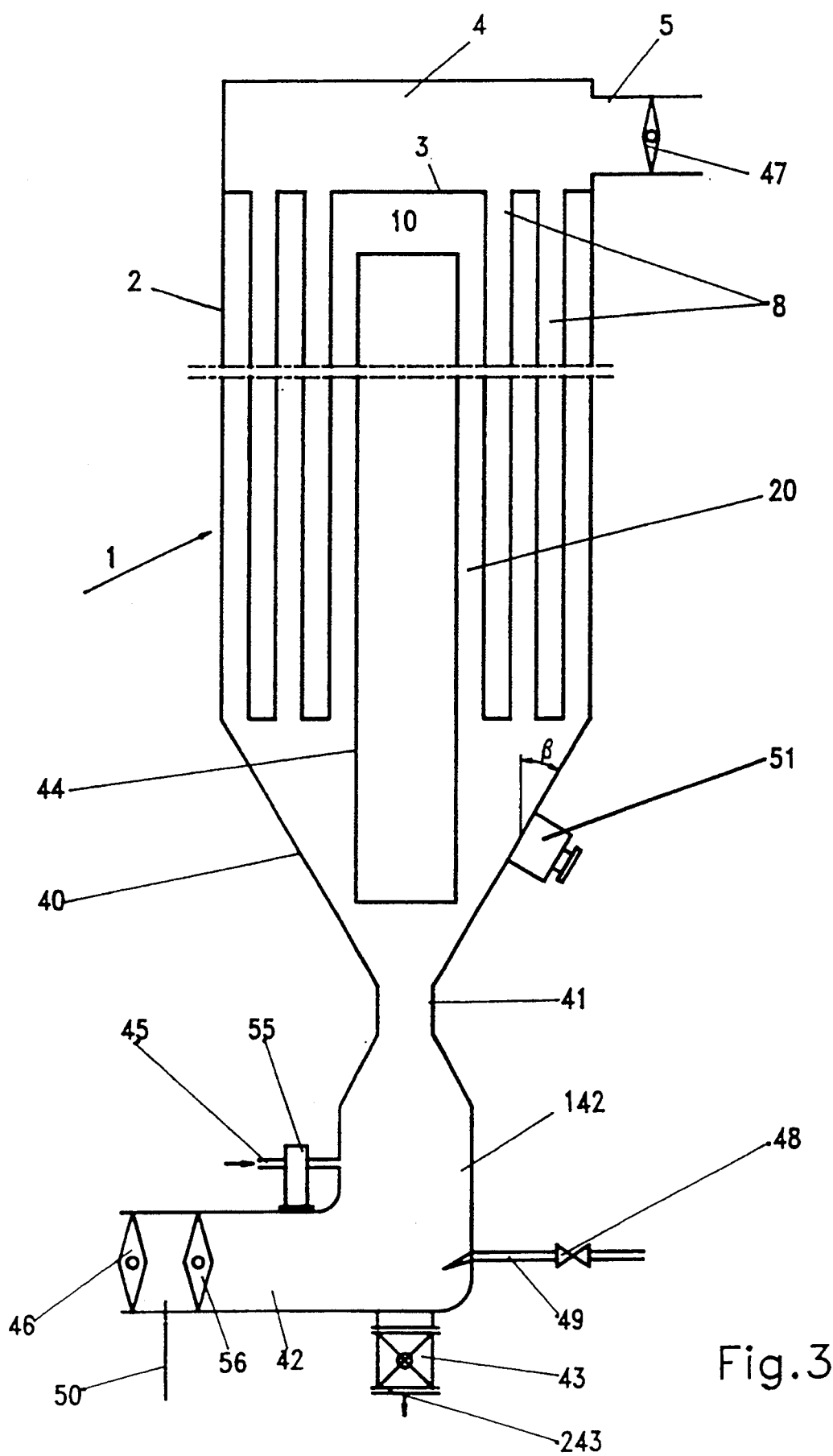
FIG. 3 is a view of an apparatus for the performance of the invention method.

This disadvantage can be avoided according to the present invention in that the parts serving as hopper walls 6 of the dust collection hopper in FIG. 1, perform in FIG. 3 also the function of the dust guide sheet metal pieces.

To allow the nozzle to capture and to return the dust, flowing off at the inclined floor or hopper wall 40, functioning as dust guide sheet metal pieces, the nozzle has now to be disposed correspondingly deeper and/or lower and thus outside of the filter casing. The nozzle 41 can now also be fixedly connected to the inclined hopper walls 40. The trap shaft, circulation pipe or central guide pipe 44 is also correspondingly relocated downwardly in order to be able to maintain the return effect (recirculation) unchanged. The raw gas channel 42 joins into the bottom of a vertical riser conduit 142, where the upper part of the vertical riser conduit is fixedly connected to the lower part of the nozzle 41. The raw gas channel 42 and the vertical riser conduit 142 are also relocated downwardly and to the outside of the filter casing 2. The vertical riser conduit 142 is furnished with a lower dust discharge 43 such as, for example, a cell wheel sluice, for the separating out and discharge of the used adsorbent under sluice operation. The inner open diameter of the nozzle 41 can be from about 0.1 to 0.4 times the inner open diameter of the raw gas channel 42 and preferably 0.15 to 0.3 times the inner open diameter of the raw gas channel 42.

The invention steps result in that not only the dust guide sheet metal pieces 12, illustrated in FIG. 1, but also the hinges 13, as well as the devices required for the inclination adjustment and the adjustment of the slot sizes, illustrated in FIG. 2, can be eliminated. In addition, the complete filter casing can be constructed smaller even though a steeper inclination angle is employed. This results overall in a substantial cost savings.

According to the prior art shown in FIGS. 1 and 2, the nozzle 15 is furnished with the upper nozzle walls 16 forming automatic closure flaps, which flaps close during an operational disturbance and which flaps prevent an entering and penetration of larger volumes of dust into the nozzle 15 and into the raw gas channel 18. Based on the invention device, these closure flaps can also be dispensed with, since the used or spent adsorbent according to the invention is discharged anyway through the nozzle 41 and the raw gas channel 42, illustrated in FIG. 3 via the lower dust discharge 43 during the off-line operation. This results in a further cost saving. Simultaneously, the nozzle hinges 17 are eliminated and not present according to the present invention. Such nozzle hinges 17 and/or rotary parts are always subject to disturbances in a dedusting operation. The elimination of these hinge parts assures a safe and reliable course of operation.

The above recited disclosure, relating to an apparatus for the purpose of assuring the dust discharge at the dust guide sheet metal pieces under any operating conditions and at reduced cost leads, however, to the problem that the discharge of the used adsorbent is now no longer possible during operation. A thereby resulting second purpose and object of this invention comprises a processing and chemical engineering method to allow the maintenance of the desired dust return quota and to centrifuge, expel, and/or remove the used or spent adsorbent from the process.

According to the state of the art, as exemplified in the German Printed Patent Document DE 38 01 913 and DE 38 06 862, the ratio of the dust return relative to the employed fresh product was in fact controlled by the adjustment of the openings or slots 28 in the dust guide sheet metal pieces 12, as illustrated in FIG. 2, and the excess dust amount was continuously withdrawn at the dust collection hopper 6 with the aid of a discharge member or exit exit sluice 7, illustrated in FIG. 2. The device according to the present invention, however, is no longer furnished with the slots 28, illustrated in FIG. 2, and the flow-free zone in the lower part of the bin or dust collection hopper 6, illustrated in FIG. 1, where the slots 28 and the dust collection hopper 6 are both required in order to continuously withdraw the used or spent adsorbent while maintaining the desired return rate during through-passage of a gas passage flow.

The present invention relates to a method for the operation of a depositing and separating plant with several filter chambers formed as bag filter collectors. This means that at least two filter chambers are present in an apparatus structure allowing performance of the invention, i.e. the invention method can only be performed when at least two chambers are combined to form a plant.

Figure 5:
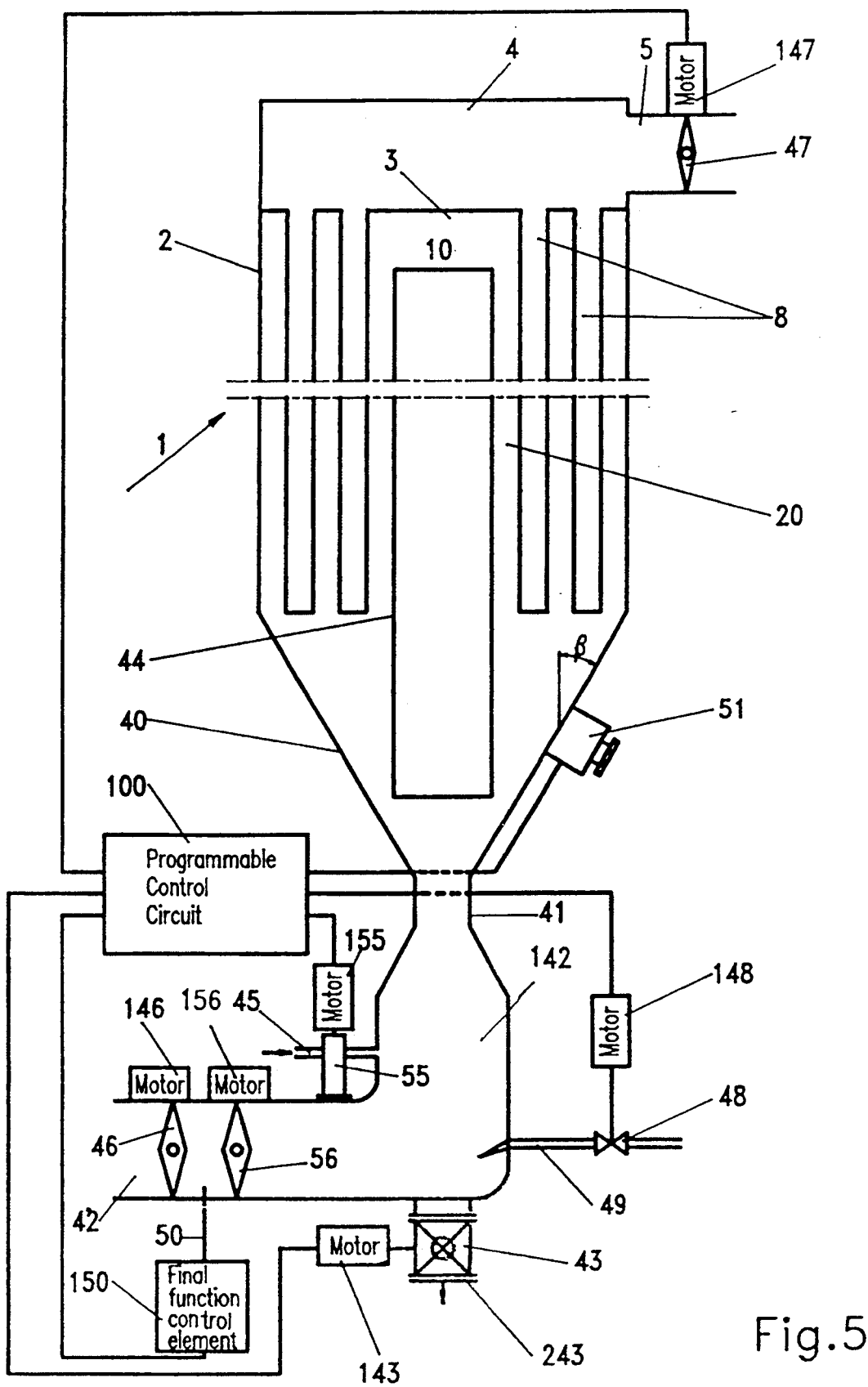
FIG. 5 is a schematic view of a diagram of a control of a filter chamber.

According to the invention, the discharge of the used or spent adsorbent is made possible by stopping operation of one respective filter chamber in preselected cycles and by closing said respective filter chamber on the gas input and gas exit sides by a valve lock or raw gas flap 46 disposed in the raw gas channel 42 and by a valve lock or pure gas flap 47, illustrated in FIGS. 3 and 5. An additional valve lock or second raw gas flap 56 can be disposed in the raw gas channel 42. The raw gas flap 46 can be controlled by the electric motor 146, the pure gas flap 47 can be controlled by the electric motor 147, and the second raw gas flap 56 can be controlled by electric motor 156, and the motors in turn are operated based on the cycle of the invention process by a programmed control 100. Cleaned dust can now pass through the at this point no longer gas-flow-passing nozzle 41 and the raw gas channel 42 to the lower dust discharge 43, represented by a sluice controlled by a motor 143 and having a discharge sluice 243, illustrated in FIG. 3, in order to be discharged from there.

According to the invention, there is furthermore maintained the desired dust return ratio by selecting the cycle of the off-/on-line operation such that just so much dust is discharged during the off-line operation, by cleaning and purifying a certain partial amount of the bags present in a chamber, as fresh adsorbent has been fed in during the time duration of the on-line operation. The automatic control of this process is achieved via a programmed control 100. The programmed control 100 determines after how much time the next off-line cleaning of a certain part amount of the existing bags is to be performed by starting with the mathematical product resulting from the fed-in fresh adsorbent volume times time and the programmed control 100 initiates this process. Of course, the adsorbent feed line 45 with adsorbent-feed-line valve 55 for the vertical riser conduit 142 is interrupted by the programmed control 100 for the time duration of the off-line period, as illustrated in FIG. 5.

The raw gas flap 46 and the pure gas flap 47, as illustrated in FIG. 3, are opened again and the passage flow of the filter system is thus released again after a performed cleaning out during the off-line operation. Simultaneously, a fresh adsorbent is fed in again via the adsorbent feed line 45 and a certain part amount of bag rows is cleaned in order to restore the dust return immediately.

According to the invention, there occurs now in such a battery including several chambers the common application of the on-line operation and of the off-line operation. This is clearly shown in FIG. 6.

Figure 6:
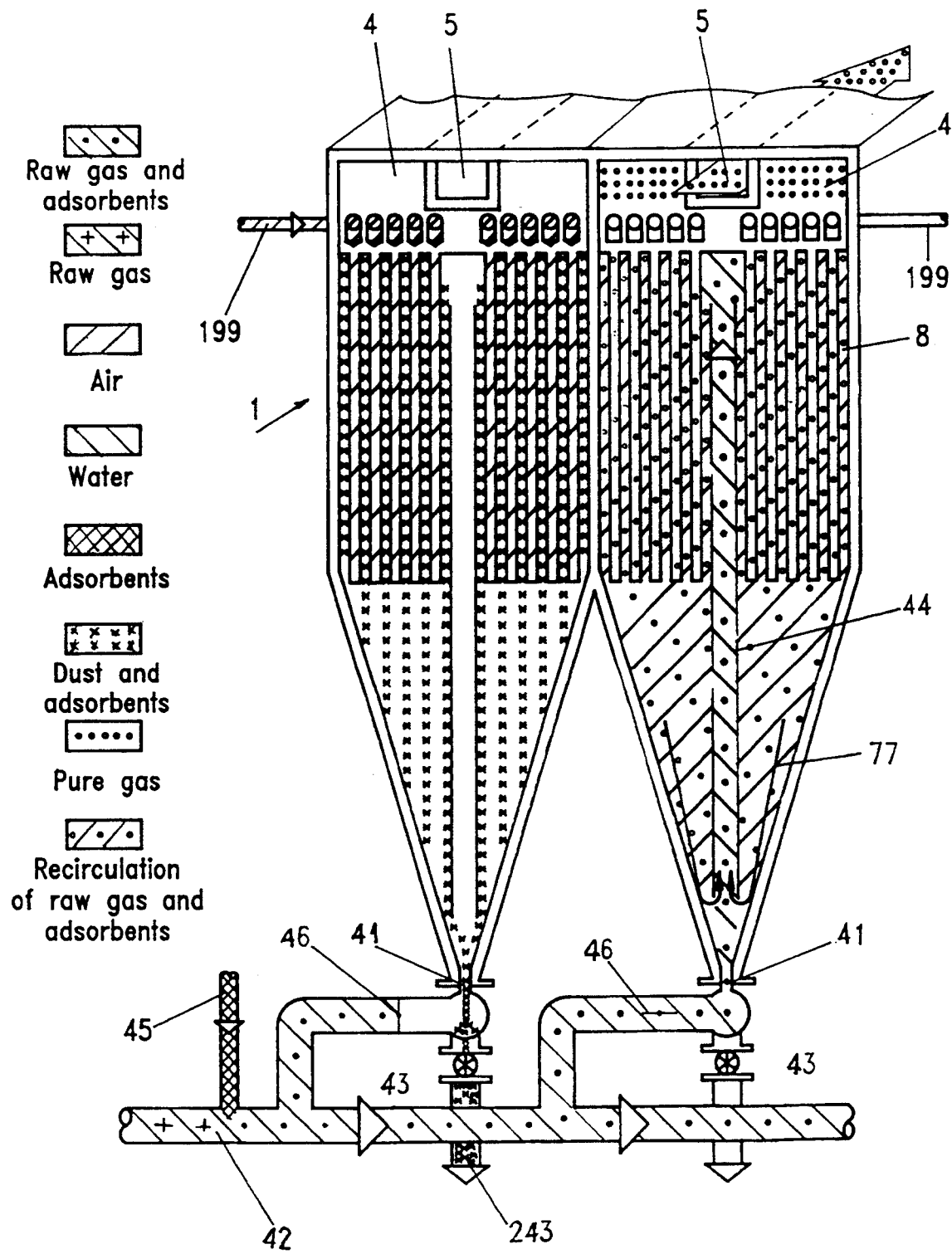
FIG. 6 is a view of two filter chambers in on-line and off-line operation.

The right chamber in FIG. 6 is operated in on-line operation, i.e. the raw gas flap 46 and the pure gas flap 47 are open such that the raw gas stream can flow through the nozzle 41 into the filter chamber 1 with its inner circulation. The filter chamber 1 is constructed such that in this case the principle of the loop reactor is realized. This means that a larger dust-gas mixture volume recirculates within the filter chamber 1. In other words, the gas volume participating in the inner circulation 77 is substantially larger than the gas volume which is fed in by the raw gas channel 42 or which is led off through the pure gas discharge ports or the pure gas channel 5. The inner circulation 77 is maintained through the per se known loop reactor by way of the central guide pipe 44 and the pressure relationships within the filter chamber. Additional devices are not required for this purpose. The dust-laden gas is led several times into circulation based on the principle of a loop reactor, i.e. the raw gas exiting on the top from the central guide pipe 44 is led automatically downwardly based on the pressure relationships and is again fed from below into the central pipe. A part of the gas penetrates through the walls of the fabric filter bags during the downward streaming, wherein the dust is deposited at the outer walls of these bags. The thereby purified gas then passes through the filter chamber 1 into the pure gas channel 5. This on-line operation is performed in all filter chambers for such a time until the filter bags have lost their filtering effect, because the deposited dust layer has become too thick.

In order to be able to maintain the filter operation, a dust cleaning has to be performed for a short time as disclosed in the present application. For this purpose, the individual filter chambers 1 are alternatingly and for a short time switched into the off-line operation. This means that the raw gas stream is switched off by a closing of the raw gas flap 46, 56, and the pure gas flap 47 and, simultaneously, the cleaning air is switched on, where the cleaning air passes through the filter bags from the inside in contrast to the waste gas. The dust is thereby blown off the filter tubes, falls onto the inclined floor, and can be discharged through the discharge sluice 243. After this short switching period, the flushing air stream is again switched off and the raw gas stream is switched on, i.e. the filter chamber 1 is again set up for the on-line operation. Thus, the filtering operation of the total battery of filter chambers can be continuously maintained.

The filter chamber, which is switched to off-line, is also in operation, but the filter chamber is operating in another manner, namely, the filter chamber is being emptied. The operating procedure for an emptying operation is referred to as off-line.

As far as the countercurrent-circulation method is concerned, this method can be used according to the invention but does not have to be used. The left filter chamber of FIG. 6 shows the off-line phase and the right filter chamber of FIG. 6 shows the on-line phase. It can be clearly recognized that the raw gas stream is fed with the primary (fresh) adsorbent through the nozzle 41 to the central guide pipe 44 or, respectively, to the jet pipe. The arrows 77 (FIG. 6) indicate the gas return, which is designated as inner circulation or as recirculation. The cleaned gas discharges from the pure gas chamber 4. In the off-line operation in the left filter chamber, the raw gas stream with the primary adsorbent is switched off, and the compressed air for filter-bag cleaning is fed in through compressed-air line 199. Thereby the separated dust or the adsorbent is discharged through the lower dust discharge 43. The differing operation methods are clearly recognized from this illustration.

The joint application of the on-line method and of the off-line method is ideal and it is an inventive accomplishment to provide an optimal filter operation achieved with the employment of these two methods (countercurrent cleaning method and impulse method) in one common installation.

This switching effect of the applicant is achieved by connecting integrated raw gas channels 42 and pure gas channels 5 with the corresponding raw gas flaps 46 and pure gas flaps 47 by adjustment of the flaps in the line filter system. Thus, on-line and off-line are carried out simultaneously in one installation. It is thereby achieved that the feed of the adsorbent to the nozzle is maintained with on-line and that a partial emptying of the reacted adsorbent (reaction products) is carried out simultaneously with off-line. A perfect filter operation is thereby assured at all times, i.e. over a longer period of time.

As far as the disposition of the nozzle 41 is concerned, the nozzle is disposed in front of the central guide pipe 44 as shown in FIG. 6. The bag filter collector or filter chamber 1 is formed by a filter casing and the filter bags 8 are disposed in said filter casing. The filter bags are made of fabric. The primary adsorbent is fed at the adsorbent feed line 45 to the raw gas stream and, through the recirculation or, respectively, the inner circulation, the portion of adsorbent collects in the circulation cycle in the 20 up to more than 80 fold. For the purposes of the present invention, the circulation and the recirculation are one and the same thing, i.e. these two processes are physically identical.

No part of the apparatus is kept idle but, as already described above, one part of the apparatus is switched to another mode of operation.

An adjustable part amount of bags is cleaned in an also adjustable time interval during the on-line operation for maintaining the dust return, and the dropping dust is returned to the cycle via the nozzle jet. The desired dust return ratio is set by a suitable selection of time interval and size of the part amount of the respective bags to be cleaned by the programmed control 100.

According to the present invention one of the filter chambers is cleaned alternatingly with an input side gas disconnection and an output side gas disconnection in an off-line operation for the separation and deposition of the reaction product and thereby the sorbents entry is interrupted for these filter chambers subjected to cleaning. Simultaneously, at least one filter chamber is cleaned for the maintaining of the dust fed back during on-line operation with an adjustable part-amount of bags in settable time period interval and the dust thereby deposited is returned to the circulation and recirculation of the dust return.

According to the present invention, no filter chamber is put out of operation for servicing purposes. Rather, one filter chamber of the on-line operation is switched for a short period of time, less than one minute, into the off-line operation such that this filter chamber can be partially emptied. The period of off-time can be from about 0.2 to 0.8 minutes and is preferably from 0.4 to 0.6 minutes.

According to the present invention method, there merely occurs a switching in one filter chamber of the processing operation for a short period for the discharge the reaction product. In this case, the input and output of dust and adsorbent, respectively, is kept stable over the time unit, i.e. all filter chambers are in operation, with the only difference that one part of the filter chambers are in the gas operation and the other filter chamber is in the emptying operation.

The change effects are to be considered in that a filtering operation is performed in the on-line operation and that an emptying operation is performed in the off-line operation, wherein there occurs substantially only a partial emptying, i.e. a filtering and emptying can also be carried out in the off-line operation.

According to the present invention, the inner circulation can be effected by pulsation of the filter hoses in order to guarantee thereby the feed of adsorbent to the nozzle and thus into the circulation cycle.

The inner circulation, which is equal to the system "loop reactor" is maintained in the system, since only one part of the total system is switched for emptying purposes in off-line, i.e. even in the case of partial emptying, the inner circulation is maintained in the case of off-line.

Figure 4:
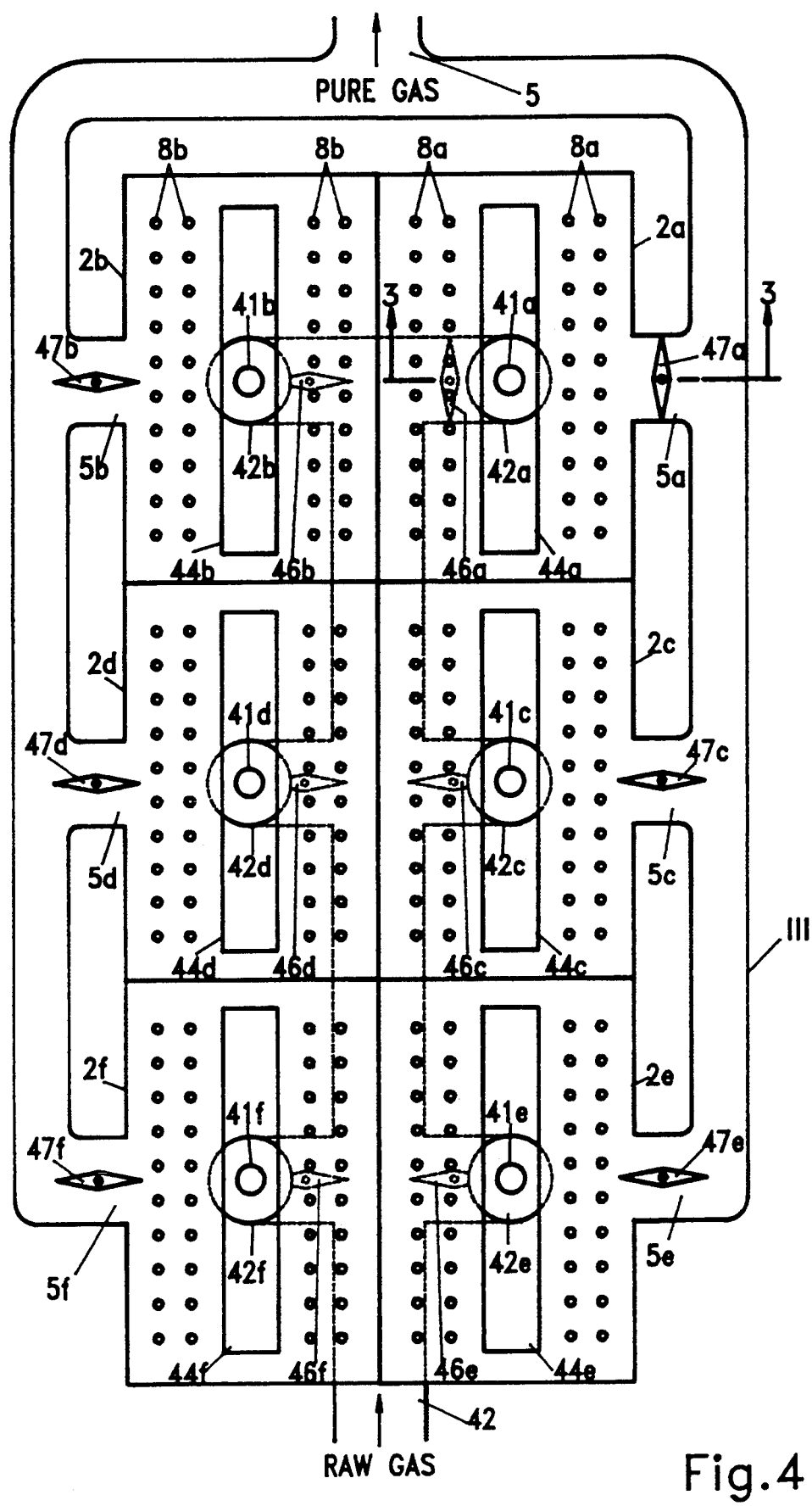
FIG. 4 is a top plane view onto the apparatus according to FIG. 3 with several filter chambers.

The on-line/off-line cycle is described according to FIG. 4. Six filter chambers $2a$ to $2f$ are illustrated, which individually correspond to the subject illustrated in FIG. 3. If, for example, the filter chamber $2a$ is to be cleaned, the raw gas flap $46a$ and the pure gas flap $47a$ are closed. In addition, the adsorbent feed line 45 for this filter chamber is switched off by the motor 155 and the adsorbent-feed-line valve 55. The remaining filter chambers $2b$ to $2f$ remain in on-line operation, i.e. the flaps $47b$ to $47f$ and $46b$ to $46f$ remain open. The filter chamber $2a$ can be cleaned in the recited flap position with the fabric filter bags $8a$ in a conventional fashion. After termination of the selected program, the filter chamber $2a$ is again taken into on-line operation and simultaneously the next filter chamber, for example, the filter chamber $2b$ is cleaned in off-line operation. All remaining filter chambers are cleaned out in a similar way.

The inclined hopper walls 40 are installed under an angle beta, which is adapted to the dust to be separated.

The angle beta can be from about 10 to 40 degrees and is preferably from 20 to 30 degrees. The hopper walls can be equipped with ventilation and/or aeration walls (not illustrated) with hole openings for removal of dust, or with a knocker or, respectively, with a vibration device 51 connected to the programmed control for a better discharge of the dust. According to FIG. 5, a further device for a better dust discharge is furnished by an aeration line 49 with an aeration valve 48 operated by a solenoid or motor 148, which loosens the dust in the lower part of the vertical riser conduit 142 and thus renders the dust more capable of flowing. The raw gas flap can be formed as a single raw gas flap 46 or as a double raw gas flap 46, 56 without or with locking sluice air feed 50 operated by a final function control element 150 connected to the programmed control 100.

Figure 7:
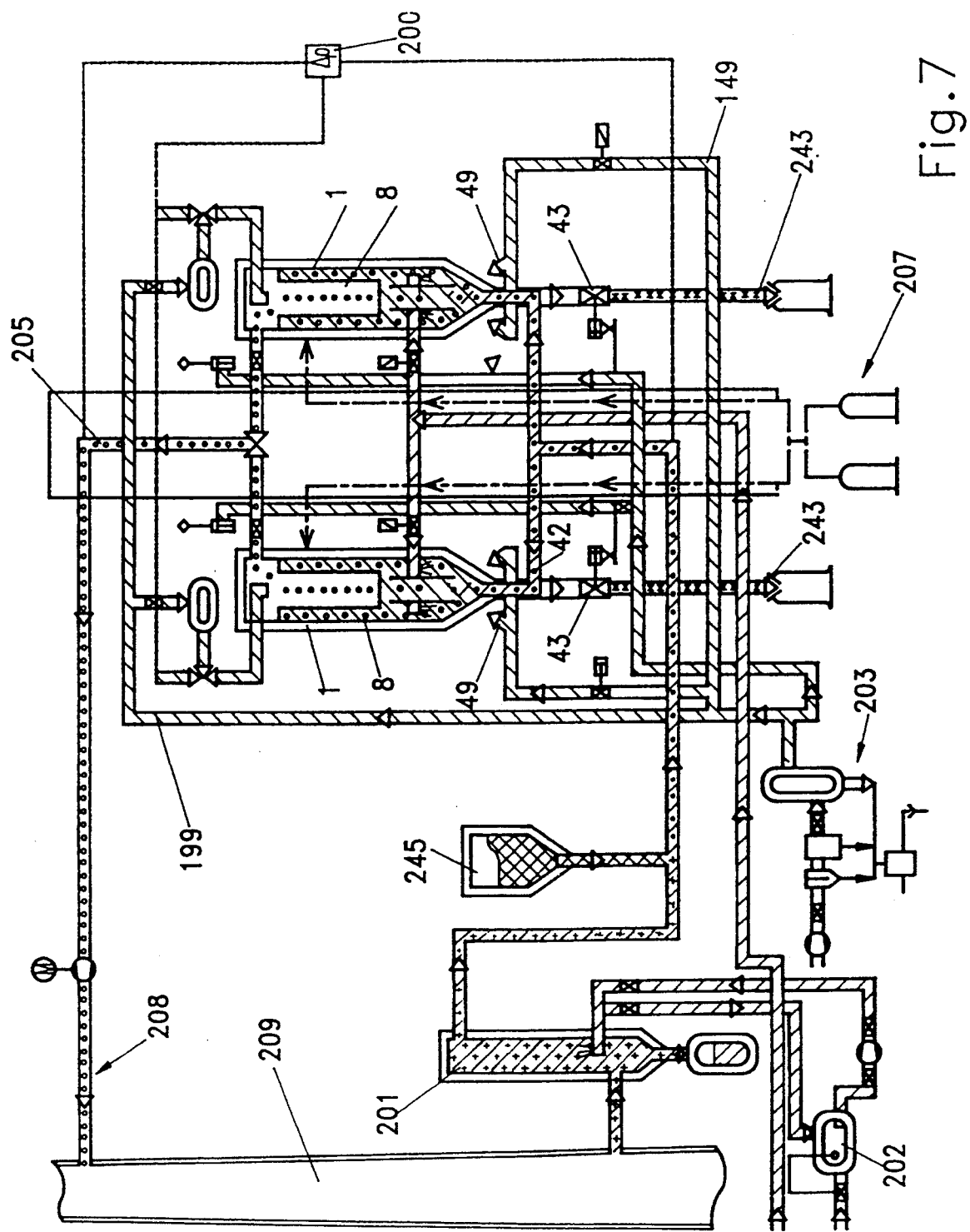
FIG. 7 is an overall circuit diagram employing the present invention.

FIG. 7 shows an overall circuit diagram employing the present invention. The raw gas, coming from the boiler, is fed in through a duct 209a. The gas enters then an evaporation cooler 201 which decreases the temperature of the raw gas to a temperature suitable for processing. The primary adsorbent is entered into the primary adsorbent feed 245. The evaporation cooler 201 is supplied with water from a water tank 202. The filter chambers 1 are containing filter bags 8. A compressed air generator 203 delivers compressed air. A compressed-air line 199 connected to the compressed air generator 203 provides air for cleaning the filter. An aeration line 149 supplies air for cleaning the nozzle area. The pure gas from the pure gas chamber 4 is fed to a clean gas exhaust line 205 and through an exhaust 208 and is discharged through the gas duct discharge 209 FIG. 7 further shows a pressure differential indicator and controller 200, which provides connections to monitor the pressure present at various positions in order to allow it a full control of the invention process.

A coordinated nozzle functions just as a regular nozzle function for the purposes of the present invention, however, it is coordinated to the trap shaft.

The theory of adsorption distinguishes two cases, namely physical adsorption and chemical adsorption. Physical adsorption can be compared to a thermodynamic process such as "where an increase amount of a gas is held back at a surface and where this holding back of the gas substantially is ruled by a thermodynamic".

In contrast, it is also possible that the material be held at the surface based on chemical reaction. Such situation is called chemisorption. In this case the adsorption is not governed by pure thermodynamics, because some kind of the chemical bond is entered at the surface and some agent is generally necessary to eliminate this chemical bond.

Consequently, a chemisorptive adsorbent is different in the specific case of an adsorbent insofar as is required the presence of a chemical action between the gaseous component and the substrate.

In the context of the present invention, a chemical reaction depends on the chemisorptive layer which is present on the substrate and on the gas actually employed. It is necessary for such a process that the gas be sufficiently reactive so that it can react with the chemically reactive surface of the substrate. The gases and the respective adsorbents are conventionally known to chemists and that a chemist of ordinary skill in the art will be able to look up if chemisorption, involving a chemical reaction, will take place or not.

The term "certain part amount" is to be read in the context of the present invention in connection with the recycling performed. If a recycling process takes place, then frequently not the full amount is immediately recycled but only a certain part.

It will be understood that each of the elements described above, or two or more together, may also find a useful application in other types of devices and methods of adsorption or chemisorption differing from the types described above.

While the invention has been illustrated and described as embodied in the context of a method and device for the adsorption and chemisorption, respectively, of gaseous components in a gas stream, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method for sorptive separation of gaseous materials out of a raw gas stream comprising
   forming a separator structure including a first filter chamber operating as a first fabric bag filter collector and including a second filter chamber operating as a second fabric bag filter collector;
   opening a first valve lock;
   feeding a raw gas mixture after passing the opened first valve lock from a bottom into a first pipe extending vertically;
   adding dusty adsorbent and recycled dusty adsorbent dust after separation and cleaning of the recycled dusty adsorbent to the raw gas mixture moving in upward direction in the first vertically extending pipe;
   accelerating the raw gas stream in a first neck forming a first nozzle at an upper end of the first pipe extending vertically;
   feeding the raw gas mixture and the dusty adsorbent to the first filter chamber including a plurality of fabric filter compartments;
   maintaining a part of the raw gas mixture in the first fabric bag filter collector by passing the raw gas mixture through a first trap shaft after accelerating with the first nozzle;
   opening a second valve lock;
   feeding a raw gas mixture after passing the opened second valve lock from a bottom into a second pipe extending vertically;
   adding dusty adsorbent and recycled dusty adsorbent after separation and cleaning of the recycled dusty adsorbent to the raw gas mixture moving in upward direction in the second vertically extending pipe;
   accelerating the raw gas stream in a second neck forming a second nozzle at an upper end of the second pipe extending vertically;
   feeding the raw gas mixture and the fresh dusty adsorbent to the second filter chamber including a plurality of fabric filter compartments;
   maintaining a part of the raw gas mixture in the second fabric bag filter collector by passing the raw gas mixture through a second trap shaft after accelerating with the second nozzle;

closing the first valve lock;

stopping the feeding of the raw gas mixture to the bottom of the first pipe extending vertically;

closing a first output valve connected to a first output of the first filter chamber;

subjecting the first filter chamber to a cleaning while said first filter chamber is off-line for the separation operation from the raw gas stream;

separating the reaction product including the dusty adsorbent and the adsorbed material out of the first filter chamber by extracting said reaction product from the filter bags and by passing said reaction product downwardly through the first neck and a dusty adsorbent outlet, and operating simultaneously the second filter chamber in on-line operation, wherein all the dusty adsorbent falling from the filter bags during gas infeeding is put into circulation; and employing a dusty adsorbent return by recirculating a volume from about 20 to 80 times more recycled adsorbent from the first filter chamber as compared to the weight of the fresh adsorbent added to the process per time unit.

2. The method for sorptive separation according to claim 1 further comprising employing a chemisorptive adsorbent as the dusty adsorbent for effective separation and removal of a gaseous component from the raw gas mixture.

3. The method for sorptive separation according to claim 1 further comprising employing a dry adsorbent as the dusty adsorbent for effective separation and removal of a gaseous component from the raw gas mixture.

4. The method for sorptive separation according to claim 1 further comprising opening the first valve lock;

feeding the raw gas mixture after passing the opened first valve lock from a bottom into the first pipe extending vertically;

adding dusty adsorbent and recycled dusty adsorbent after separation and cleaning of the recycled dusty adsorbent to the raw gas mixture moving in upward direction in the first vertically extending pipe;

accelerating the raw gas stream in the first neck forming the first nozzle at an upper end of the first pipe extending vertically;

feeding the raw gas mixture and the fresh dusty adsorbent to the first filter chamber including the plurality of fabric filter compartments;

maintaining a part of the raw gas mixture in the first fabric bag filter collector by passing the raw gas mixture through a first trap shaft after accelerating with the first nozzle;

closing the second valve lock;

stopping the feeding of the raw gas mixture to the bottom of the second pipe extending vertically;

closing a second output valve connected to a second output of the second filter chamber;

subjecting the second filter chamber to a cleaning while said second filter chamber is off-line for the separation operation from the raw gas stream; and separating the reaction product including the dusty adsorbent and the adsorbed material out of the second filter chamber, and operating simultaneously the first filter chamber in on-line operation;

wherein a second raw gas feed and a second pure gas channel are closed during the off-line operation of the second filter chamber, and wherein fabric bags of the second fabric filter compartment are cleaned during this state of the processing.

5. The method for sorptive separation according to claim 1 further comprising cleaning some of the fabric bags present in the first filter chamber;

selecting a cycle of the off-line/on-line operation for maintaining a selected set ratio of dusty adsorbent return relative to fresh dusty adsorbent entered per unit of time such that the amount of finally discharged dusty adsorbent is equal to the amount of fresh dusty adsorbent entered and fed in during the time duration of the on-line operation.

6. The method for sorptive separation according to claim 1 further comprising vibrating a wall of the filter chamber during operation and employing the neck both as a passage for feeding the gas to the filter chamber and as a passage for discharging dust collected at fabric filters of the first filter chamber, wherein the first neck is a Venturi pipe section, wherein the adsorbent outlet is a dust discharge valve disposed vertically below the first neck, which valve is closed during gas cleaning and which valve is open during regeneration of the filter bags.

7. The method for sorptive separation according to claim 1 further comprising beating a wall of the filter chamber repeatedly during operation for loosening deposits adhering to the wall.

8. A method for adsorption or chemisorption of gaseous materials out of a raw gas stream by reacting of dusty adsorbent with gas components to be adsorbed, wherein the raw gas and dusty adsorbent are fed to a separator structure with a filter chamber formed as a bag filter collector, wherein a trap shaft is disposed in the filter chamber, wherein a dusty adsorbent return is performed with a recirculation of from about a 20 to 80-fold amount relative to the amount of the employed fresh dusty adsorbent in the filter chamber, wherein a part of the raw gas is maintained in circulation in the fabric bag filter of the bag filter collector by way of the trap shaft with a nozzle, wherein the nozzle is disposed below the trap shaft in order for the dusty adsorbent to fall onto the inclined floor toward the nozzle such that substantially all the dust falling from the bags during gas infeeding is put into circulation in the filter chamber and wherein upon switching off of the feeding of raw gas and of dusty adsorbent the separated dusty adsorbent in the filter chamber is extracted from the filter bag through said nozzle and is fed back into the recirculation after its cleaning.

9. The method according to claim 8, wherein the respective raw gas feed and the respective purified gas discharge are closed when the feeding in of raw gas and dusty adsorbent is switched off.

10. The method according to claim 9, wherein circulation is resumed in the first filter chamber after the cleaning;

wherein a second filter chamber is subjected to a dust separator while the first chamber remains operating;

wherein a cycle of the off-line/on-line operation is continued between the first filter chamber and the second filter chamber, wherein the cycle is selected for maintaining a selected set ratio of dusty adsorbent return relative to fresh dusty adsorbent such that an amount of discharged dusty adsorbent is equal to the amount of fresh dusty adsorbent entered and fed in during the time duration of the on-line operation, by cleaning a certain part amount of the fabric bags present in a respective filter chamber.

11. An apparatus for sorptive separation consisting essentially of
   a machine frame;
   a filter chamber mounted on the machine frame and having a top and a bottom;
   fabric filter bags disposed in said filter chamber, wherein the fabric filter bags surround a central free space of the respective one of the filter chamber;
   an upper pure gas chamber connected at a top of the filter chamber;
   an inclined floor of the filter chamber;
   a lower center opening in the inclined floor;
   a trap shaft disposed within a free space inside the filter chamber at a distance relative to the upper pure gas chamber and above the lower center opening;
   a restricted section forming a nozzle connected to the lower center opening in the inclined floor, wherein the restricted section is spaced apart from the trap shaft and wherein the restricted section is coordinated symmetrically and leaving an open passage distance to the lower end of the trap shaft and fixedly connected to the inclined floor in the region of the lower center opening of the inclined floor in order for the dusty adsorbent to fall onto the inclined floor toward the lower center opening such that substantially all the dust falling from the bags during gas infeeding is put into circulation in the filter chamber and for receiving and for passing through dusty adsorbent collected on the filter bags during a cleaning operation of the filter bags and said restricted section further having a lower opening;
   a vertical riser conduit having a lower end and having an upper end connected to the restricted section;
   a raw gas channel connected to the lower end of the vertical riser conduit;
   a lower dust discharge connected at the bottom of the vertical riser conduit;
   a discharge sluice furnished in the raw gas channel;
   gas supply means connected to the raw gas channel for feeding gas to the raw gas channel.

12. The apparatus for sorptive separation according to claim 1, wherein the inclined floor forms an angle of from about 20 to 30 degrees between a vertical line and a tangent face of an inclined wall of the filter chamber.

13. The apparatus for sorptive separation according to claim 11, further comprising
   opening and closing means disposed in the gas supply line for releasing operation and for blocking operation of the filter chamber.

14. The apparatus for sorptive separation according to claim 13, further comprising
   a second opening and closing means disposed in the raw gas channel for releasing operation and for blocking operation of the filter chamber thereby forming an air lock by combination of the first opening and closing means and of the second opening and closing means;
   a feed for blocking air connected to the raw gas channel between the first opening and closing means and the second opening and closing means.

15. The apparatus for sorptive separation according to claim 11, further comprising
   a feed line for fresh adsorbent material joining the raw gas channel prior to the connection to the nozzle.

16. The apparatus for sorptive separation according to claim 11, further comprising
   gas supply means for splashing compressed gas into the filter chamber and located near the bottom of said vertical riser conduit to assist in removing dust from the vertical riser conduit.

17. The apparatus for sorptive separation according to claim 11 further comprising
   a feed line for delivering fresh dusty adsorbent material to the gas passing through the vertical riser conduit at a point prior to the connection of the vertical riser conduit to the restricted section.

18. The apparatus for sorptive separation according to claim 11 wherein the raw gas channel is disposed horizontally and is connected through an elbow to the lower end of the vertical riser conduit;
   wherein the restricted section forming a nozzle is operatively connected to the bottom of the filter chamber;
   wherein said restricted section in combination with the inclined floor of the filter chamber and a larger diameter of the vertical riser conduit forms the nozzle capable of collecting and passing particulates formed in the filter bags during operation.

19. The apparatus for sorptive separation according to claim 11, further comprising
   wherein the vertical riser pipe is formed at it lower end like an elbow and where the elbow is furnished with an opening for the lower dust discharge sluice and wherein the lower dust discharge sluice includes a valve;
   wherein the lower discharge sluice, the vertical riser conduit, the restricted section and the trap shaft are aligned along a vertical axis;
   wherein the diameter of the vertical riser conduit is larger than the conduit of the trap shaft.

20. An apparatus for sorptive separation comprising
   bag filters disposed in a filter chamber, with filter bags surrounding a central free space, an upper pure gas chamber and a lower dust discharge, wherein an inclined floor with a feed opening for gas is provided to form a lower part of the filter chamber, wherein a trap shaft is disposed within the free space at a distance relative to a pure gas chamber part of the filter chamber and above the feed opening,
   wherein a restricted section forms a nozzle and is connected at an upper end to the feed opening, wherein the restricted section is coordinated symmetrically with a distance to the lower end of the trap shaft, wherein the inclined floor is fixedly connected in the region of its opening to the restricted section in order for the dusty adsorbent to fall onto an inclined floor toward a raw gas feed-in such that substantially all the dust falling from the bags during gas infeeding is put into circulation in the filter chamber and in order to pass dropping dusty adsorbent through the feed opening into and through the restricted section for removal and extraction of the dusty adsorbent during switching off of the gas feed-in of the respective filter bag for emptying the filter chamber of the dusty absorbent;

a vertical riser conduit connected at an upper end to a lower end of the restricted section;

a gas feed line connected to a lower end of the vertical riser conduit for feeding gas into the lower end of the vertical riser conduit; and a discharge sluice furnished in the gas feed line.

21. The apparatus for sorptive separation according to claim 20, further comprising vibration means disposed at an inclined section of the filter chamber;

a feed line for dusty adsorbent connected to the vertical riser conduit for delivering active dusty adsorbent material to the gas prior to reaching the restricted section;

gas supply means connected to the gas feed line;

a discharge member for spent dusty adsorbent disposed at a bottom of the vertical riser conduit;

an aeration line connected to the vertical riser conduit;

an aeration nozzle connected to the aeration line and directed toward the discharge member for loosening dust in a lower part of the vertical riser conduit upon a feeding of compressed air by the gas supply means;

an aeration valve disposed in the aeration line.

22. A method for adsorption or chemisorption of gaseous material from a raw gas stream by adding dusty adsorbent for gas components, wherein the raw gas and a fresh adsorbent are fed to a separator structure with a filter chamber formed as a bag filter, wherein a dust return is performed with a recirculation of from about 20 to 80-fold amount adsorbent in the filter chamber, and wherein a part of the gas is maintained in circulation in the bag filter with a trap shaft for gas flow distribution with a nozzle coordinated to the trap shaft, such that substantially all the dust falling from the bags during gas infeeding is put into circulation in the bag filter by the gas entering through the nozzle wherein the filter chamber is cleaned by closing of input side gas connection for separating the reaction product and wherein the entry of the adsorbents is thereby interrupted for the filter chamber and the reaction product is discharged, and wherein simultaneously the filter chamber is cleaned for maintaining the dust return and wherein the deposited dusty adsorbent is recycled.

23. The method according to claim 22, wherein the feed-in of the sorbent for the filter chamber, closed on the gas input side, is interrupted by a programmable control circuit.

24. The method according to claim 23, wherein the cycle of the off-line/on-line operation selected for maintaining a selected set ratio of dusty adsorbent return relative to fresh dusty adsorbent entered such that the amount of discharged dusty adsorbent is equal to the amount of fresh dusty adsorbent entered and fed in during the time duration of the on-line operation by cleaning a certain part amount of the fabric filter bags present in one filter chamber.

25. The method according to claim 24, wherein the cycle of the off-line/on-line operation is controlled by a programmable control circuit.

26. The method for adsorption or chemisorption of gaseous material from a raw gas stream according to claim 22 further comprising feeding fresh dusty adsorbent to the raw gas stream.

27. The method for adsorption or chemisorption of gaseous material from a raw gas stream according to claim 22 further comprising discharging a part of dusty adsorbent from the filter chamber, wherein the part of dusty adsorbent is added to fresh dusty adsorbent such that the amount of discharged dust is equal to the amount of fresh dusty adsorbent entered and fed in during the time duration of the on-line operation.

28. The method for adsorption or chemisorption of gaseous material from a raw gas stream according to claim 22, further comprising collecting the dusty adsorbent falling onto an inclined floor into a center opening at the lower end of the inclined floor;

returning the dusty adsorbent falling onto the inclined floor into a circulation of the dusty adsorbent;

passing the dusty adsorbent through a riser pipe connected to the opening;

passing the dusty adsorbent through a discharge sluice connected to a bottom end of the riser pipe, wherein a dusty adsorbent return is performed with a recirculation of from about a 20 to 80-fold relative to the amount of fresh dusty adsorbent entered.

29. A method for adsorption or chemisorption of gaseous material from a raw gas stream comprising feeding a raw gas loaded with dusty adsorbent and recycled adsorbent dust to a separator structure with several bag filters, wherein the dusty adsorbent has properties to bind gas components of the raw gas, and where such gas components are to be removed from the raw gas;

creating a mixture of a dusty adsorbent and a raw gas and feeding said mixture into a filter chamber;

separating unreacted adsorbent in the filter chamber, wherein the dusty adsorbent falls onto an inclined floor toward a raw gas feed-in such that substantially all the dust falling from the bags during gas infeeding is put into circulation in the filter chamber;

switching the feeding of the filter chamber off;

blowing off the dusty adsorbent from filter bags, wherein the dusty adsorbent falls onto an inclined floor to be discharged at the time while the feeding of said mixture is switched off.

* * * * *